(12) United States Patent
Messer et al.

(10) Patent No.: US 6,990,662 B2
(45) Date of Patent: Jan. 24, 2006

(54) METHOD AND SYSTEM FOR OFFLOADING EXECUTION AND RESOURCES FOR RESOURCE-CONSTRAINED NETWORKED DEVICES

(75) Inventors: Alan Messer, Los Gatos, CA (US); Ira Greenberg, Mountain View, CA (US); Dejan Miljicic, Palo Alto, CA (US); Philippe Bernadat, Varces (FR); Guangrui Fu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 682 days.

(21) Appl. No.: 10/001,074

(22) Filed: Oct. 31, 2001

(65) Prior Publication Data

US 2003/0084435 A1 May 1, 2003

(51) Int. Cl.
*G06F 9/445* (2006.01)
(52) U.S. Cl. .............. 717/174; 717/176; 717/177; 717/178; 717/103; 709/204; 709/205; 718/104
(58) Field of Classification Search ............... 717/127, 717/131, 175–178, 103, 173; 709/201, 224, 709/220, 203, 205, 227, 229; 711/129, 170; 718/100, 105, 104; 710/15, 110; 700/3
See application file for complete search history.

(56) References Cited

U.S. PATENT DOCUMENTS

| | | | | |
|---|---|---|---|---|
| 5,590,395 A | * | 12/1996 | Diekelman | 455/13.1 |
| 5,748,468 A | * | 5/1998 | Notenboom et al. | 700/3 |
| 5,923,892 A | * | 7/1999 | Levy | 712/31 |
| 6,078,942 A | * | 6/2000 | Eisler et al. | 718/100 |
| 6,128,642 A | * | 10/2000 | Doraswamy et al. | 709/201 |
| 6,141,705 A | * | 10/2000 | Anand et al. | 710/15 |
| 6,151,709 A | * | 11/2000 | Winkel | 717/173 |
| 6,179,489 B1 | | 1/2001 | So et al. | |
| 6,212,562 B1 | * | 4/2001 | Huang | 709/227 |
| 6,539,445 B1 | * | 3/2003 | Krum | 710/110 |
| 6,539,464 B1 | * | 3/2003 | Getov | 711/170 |
| 6,601,083 B1 | * | 7/2003 | Reznak | 718/104 |
| 6,704,489 B1 | * | 3/2004 | Kurauchi et al. | 386/46 |

(Continued)

FOREIGN PATENT DOCUMENTS

EP 0668560 8/1995

(Continued)

OTHER PUBLICATIONS

TITLE: Preemptable Remote Execution Facilities for the V-System, author: Theimer et al, ACM, 1985.*

(Continued)

*Primary Examiner*—Chameli C. Das

(57) ABSTRACT

A method for offloading execution load from a resource-constrained device to allow the device to run a resource intensive software program. A program is accessed using a first device and determines whether execution of the program will exceed resources of the first device. If the execution will exceed the resources of the first device, a load split is determined to split the program into a first portion and a second portion. The second portion of the program is offloaded to a second device, while the first portion of the program is retained on the first device. The first portion and second portion communicate via a network connection. Full program functionality is provided using the first device, wherein the functionality is provided by the first portion and second portion executing respectively on the first device and the second device.

29 Claims, 5 Drawing Sheets

U.S. PATENT DOCUMENTS

| | | | |
|---|---|---|---|
| 6,718,438 B2 * | 4/2004 | Lewis et al. | 711/129 |
| 6,728,961 B1 * | 4/2004 | Velasco | 718/105 |
| 6,763,386 B2 * | 7/2004 | Davis et al. | 709/224 |
| 6,775,830 B1 * | 8/2004 | Matsunami et al. | 717/176 |
| 6,782,527 B1 * | 8/2004 | Kouznetsov et al. | 717/103 |

FOREIGN PATENT DOCUMENTS

| | | |
|---|---|---|
| WO | WO99/64952 | 12/1999 |

OTHER PUBLICATIONS

TITLE: Resource Widening Versus Replication: Limits and Performance-Cost Trade-Off, author: Lopez et al, ACM, 1998.*

TITLE: Cellular Disco: resource management using virtual clusters on shared-memory multiprocessors, author: Govil et al, ACM, 1999.*

Matchy J M Ma et al—"JESSICA: Java-Enable Single-System-Image Computing Architecture"—International Conference on Parallel and Distributed Processing Techniques and Applications—Jun. 1999—pp. 1-5.

IBM Technical Disclosure Bulletin—Method Sending Object Agent and Receiving Object Agent—vol. 39 No. 12—Dec. 1996—p. 43.

Andrzej Goscinski—"Resource Management in Large Distributed Systems"—Operating Systems Review (SIGOPS)—vol. 24 No. 4—Oct. 1990—pp. 7-25.

* cited by examiner

METHOD AND SYSTEM FOR OFFLOADING EXECUTION AND RESOURCES FOR RESOURCE-CONSTRAINED NETWORKED DEVICES

TECHNICAL FIELD

The present invention relates generally to data processing on digital computer systems and accessing information and obtaining software services by using client devices. More specifically, the present invention pertains to a method and system for sharing computer system resources for the purposes of relieving device resource constraints and diversity between different network-connected electronic devices.

BACKGROUND ART

The use of the Internet for electronic commerce and for information retrieval has rapidly proliferated in today's modern world. Hundreds of Internet sites and Web portals are constantly accessed by millions of users for obtaining information, news, entertainment, and the like, via the World Wide Web. Many aspects of business and commerce utilize the Internet for communication and coordination. Additionally, many aspects of everyday life are becoming electronically information based, and the access, control, and use of such electronic information, through the use of various types of electronic devices, is never far from hand. For example, a desktop computer allows access to banking functions (e.g., checking, bill paying, etc.), shopping (e.g., groceries, clothing, etc.), the weather, and virtually any other need of an individual. Popular forms of computer-based entertainment, such as multi-player network or on-line games, are using the communication capabilities of the Internet.

Many users are increasingly relying on the easy access to network-connected information resources, such as the millions of Web sites on the Internet, to fill all their basic everyday needs. For example, users have become familiar with the Internet destinations that help them to accomplish whatever business or pleasure they require. These Internet destinations are increasingly being accessed through mobile embedded devices. Examples of such devices include: Personal Digital Assistants (PDAs), mobile phones, watches, embedded micro-controllers, and the like. As devices capable of accessing the Internet and performing useful tasks become increasingly pervasive, users will focus less on particular aspects of a device and focus more on the usefulness of the pervasive services made available through the device and its associated computer infrastructure (e.g., a network-connected device). A mobile embedded device (e.g., a personal information device such as a palmtop computer, cellphone, or the like) allows information access to be always close at hand.

Mobile embedded devices in use today provide computing power, but operate under increased resource constraints compared to their desktop or server counterparts. While desktop computer systems often use microprocessors running at clock frequencies of 1 gigahertz or more, and are equipped with 256 MB of RAM or more, a typical handheld computer device has only a fraction of such power. As a result of these resource constraints, mobile embedded devices are greatly limited in the complexity of software programs they can run and the richness of functionality they can provide.

Mobile embedded devices also tend to have less local persistent storage in comparison to a typical desktop or server computer system. The lack of any sizable local persistent storage means the majority of mobile embedded devices are unable to overcome their resource limitations through conventional prior art techniques, such as, for example, through placing data temporarily on persistent storage (e.g., a hard disk drive).

An additional problem is the fact that mobile embedded devices are available from a much wider variety of system manufacturers in comparison to, for example, desktop computer systems. As mobile embedded devices become more popular, the number of manufacturers, and thus the number of different system architectures available in the marketplace, increases. This causes a great diversity in the architectures of the various devices. This diversity will make it increasingly difficult to construct suitable software for every device combination that provides the desired functionality.

Thus, what is required is a solution that compensates for the resource constraints of mobile embedded devices. What is required is a solution that compensates for the lack of any sizable local persistent storage in mobile embedded devices. The required solution should allow a mobile embedded device to run a larger, more resource-intensive software application despite the limited computer system resources of the device. What is further required is a solution that supports the great diversity of different architectures of various different mobile embedded devices existing in the marketplace. The present invention provides a novel solution to these requirements.

DISCLOSURE OF THE INVENTION

The present invention is a method and system for offloading execution and resources for resource-constrained networked devices. The present invention provides a solution that compensates for the resource constraints of mobile embedded devices. The present invention provides a solution that compensates for the lack of any sizable local persistent storage in mobile embedded devices. The present invention enables a mobile embedded device to run a larger, more resource-intensive software application despite the limited computer system resources of the device. Additionally, the present invention provides a solution that supports the great diversity of different architectures of various different mobile embedded devices existing in the marketplace.

In one embodiment, the present invention is implemented within the context of network-connected devices wherein resource-intensive software programs have portions of their execution load and/or resource requirements offloaded from a resource-constrained device to another device (e.g., a host device) in order to allow the resource-constrained device to run the resource-intensive software program. The resource-constrained device is typically a portable handheld device (e.g., an embedded device such as a PDA, cellphone, etc.).

The method includes the step of accessing a program using a first device (e.g., the resource-constrained device) and determining whether execution of the program will exceed resources of the first device. If the execution will exceed the resources of the first device, a load split is determined for the program to split the program into a first portion and a second portion. The second portion of the program is offloaded to a second device (e.g., the host device), while the first portion of the program is retained on the first device. The first portion and second portion communicate via a network connection between the first device and the second device (e.g., a wireless LAN link). Full program functionality is provided using the first device, wherein the functionality is provided by the first portion and second portion executing cooperatively on the first device and the second device, respectively. The resource offloading and subsequent load sharing of the program between the first device and the second device is performed in a manner transparent to the user.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Figure 1:
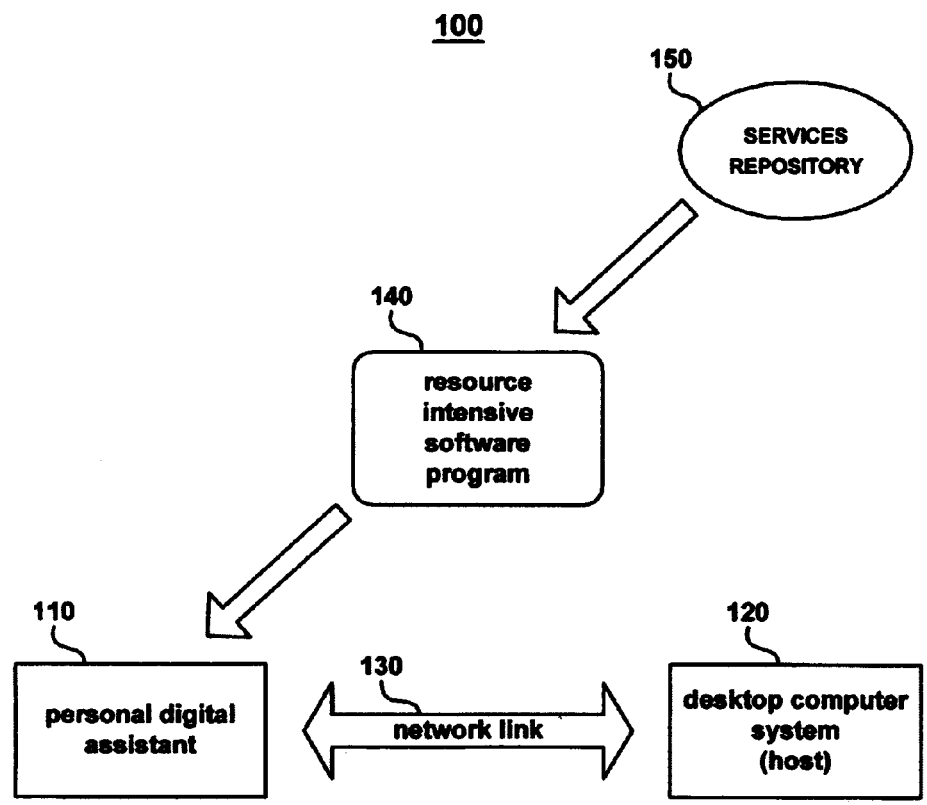
FIG. 1 shows a diagram of a resource and execution offloading system in accordance with one embodiment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Embodiments of the present invention are directed towards a method and system for offloading execution and resources for resource-constrained networked devices. The present invention provides a solution that compensates for the resource constraints of mobile embedded devices. The present invention provides a solution that compensates for the lack of any sizable local persistent storage in mobile embedded devices. The present invention enables a mobile embedded device to run a larger, more resource-intensive software application despite the limited computer system resources of the device. Additionally, the present invention provides a solution that supports the great diversity of different architectures of various different mobile embedded devices existing in the marketplace. Embodiments of the present invention and their benefits are further described below.

Notation and Nomenclature

Some portions of the detailed descriptions that follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer-executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions using terms such as "executing," "receiving," "accessing," "editing," "providing," "transmitting," "storing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices (e.g., computer system 512 of FIG. 5).

Method and System of the Invention

FIG. 1 shows a diagram of a resource and execution offloading system 100 in accordance with one embodiment of the present invention. As depicted in FIG. 1, system 100 includes a first resource-constrained device, in this embodiment a personal digital assistant (PDA) 110, and a second more powerful host device, in this embodiment a desktop computer system (e.g., PC or workstation) 120. PDA 110 and the desktop computer system 120 are communicatively connected via a network link 130. PDA 110 is also connected to receive software-based services, in this embodiment a resource-intensive software program 140, from a software-based services repository 150, such as, for example, one or more servers connected to a building's LAN, the Internet, or the like.

Referring still to system 100, the present embodiment functions within the context of network-connected devices, wherein resource-intensive software programs have portions of their execution load and/or resource requirements offloaded from a resource-constrained device to another device (e.g., a host device) in order to allow the resource-constrained device to run the resource-intensive software program. PDA 110 is a typical resource-constrained device. As such, PDA 110 has limited processor power and memory resources to execute software-based services in comparison to desktop computer system 120. The resource-constrained device depicted in FIG. 1 is a portable handheld PDA, however, it should be understood that the resource-constrained device 110 can be a number of different types of resource-constrained devices (e.g., embedded devices such as cellphones, pagers, wristwatches, etc.). Similarly, the host device depicted in FIG. 1 is a desktop computer system, however, it should be understood that the host device 120 can be a number of different types of more capable digital computer system devices (e.g., large servers, etc.).

One objective of system 100 is to enable the resource-constrained PDA 110 to run the resource-intensive software programs 140 received from the services repository 150 and provide full functionality to the user. To accomplish this objective, the software program 140 is accessed using PDA 110 (e.g., the resource-constrained device) and is initially executed on the PDA 110 to determine whether execution of the program 140 will exceed the resources of PDA 110. If the execution will exceed the resources of the first device, a load split is determined for the program to split the program into a first portion and a second portion. The second portion of the program is offloaded to host device 120 via network link 130, while the first portion of the program 140 is retained on PDA 110.

The first portion and second portion communicate via the network connection 130 between the first device and the second device (e.g., a wireless LAN link). From the user's perspective, full program functionality is provided using PDA 110. The software program 140 appears to the user as if it is executing completely within PDA 110. The resource offloading and subsequent load sharing is performed in a manner transparent to the user. The functionality of the program 140 is provided by the first portion and second portion executing respectively and cooperatively on PDA 110 and host 120.

Although the present embodiment performs the load sharing between PDA 110 and host 120 in a transparent manner, it should be noted that embodiments of the present invention can be configured to implement the load sharing in a non-transparent manner. For example, a GUI confirmation dialog box can be presented to the user (e.g., of PDA 110) to indicate a load sharing operation is about to begin. Similarly, a GUI icon can be displayed to indicate the status of load sharing.

Figure 2:
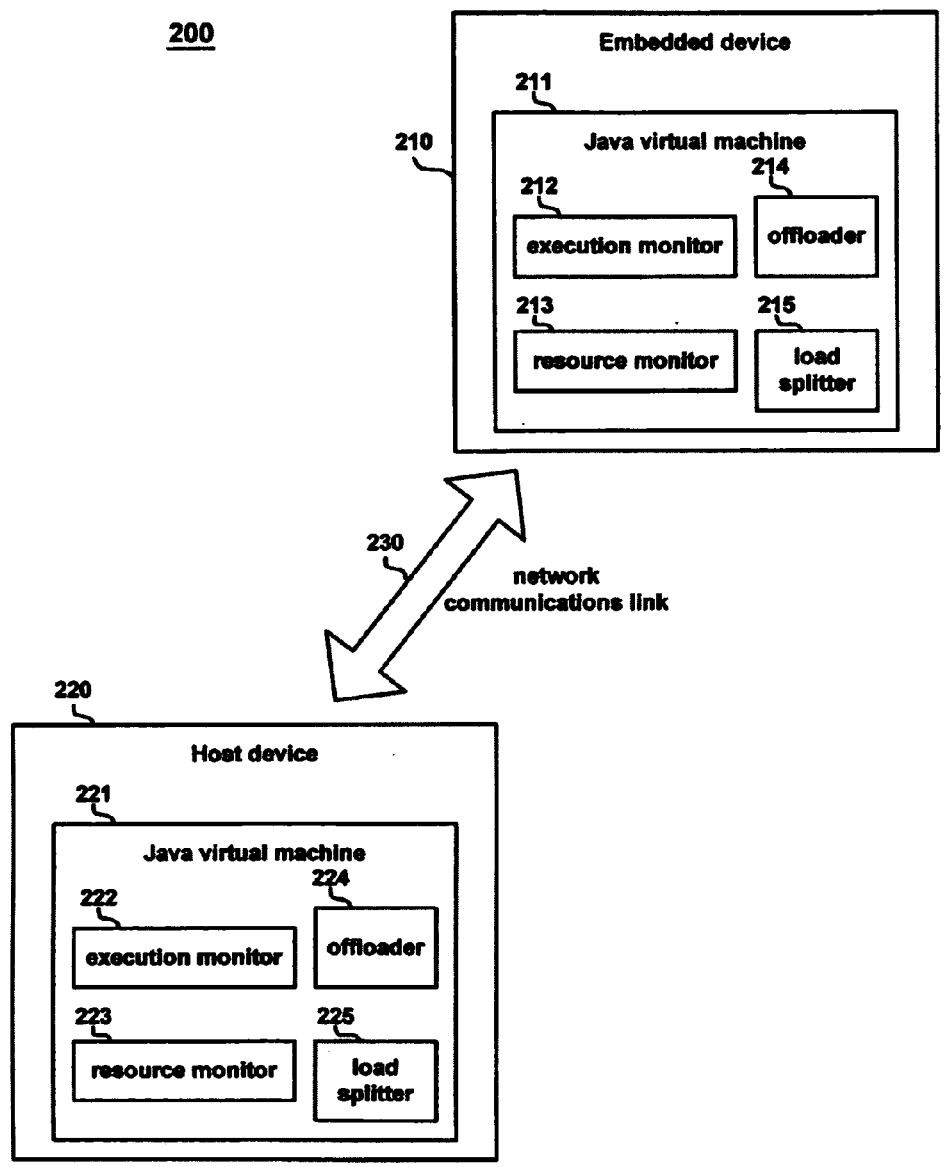
FIG. 2 shows a diagram of a system in accordance with one embodiment of the present invention.

FIG. 2 shows a diagram of a system 200 in accordance with one embodiment of the present invention. As with system 100, system 200 shows a resource-constrained device, referred to in this embodiment as embedded device 210, and a more powerful host device 220. The embedded device 210 and the host device 220 are coupled via a communication link 230.

As described above, embodiments of the present invention are directed towards a resource and execution offloading system that enables embedded device 210 to "tap" the computer system resources of host device 220 for purposes of running large resource-intensive software programs. Program execution and resource requirements are offloaded from the embedded device 210 to the host device 220 in order to allow the embedded device 210 to provide the full functionality of a resource-intensive software program to a user, even though such a program would normally overwhelm the computer system resources of the embedded device 210.

To accomplish the load sharing functionality of the present embodiment, a specialized load sharing run-time platform is used to help resource-constrained networked devices (e.g., embedded device 210) overcome their local resource constraints (e.g., memory, disk space, and processing power). In this embodiment, the platform is a specialized load sharing virtual machine (VM), however, it should be noted that other code executing components can be used to implement the load sharing functionality (e.g., distributed platforms, etc.). Similarly, it should be noted that although FIG. 2 depicts first and second Java™ compatible load sharing virtual machines 211 and 221 used in the embedded device 210 and host device 220 respectively, other types of platforms or virtual machines can be used.

The virtual machine platforms 211 and 221 execute code as is well known in the art. Additionally, virtual machines 211 and 221 perform extra functions to provide the load sharing functionality of the present embodiment: 1) Execution monitoring, 2) Resource monitoring, 3) load splitting, and 4) Offloading.

Execution monitoring refers to the fact that execution monitors 212 and 222 track the structure and execution of the code of the software program that will, or has, executed on the virtual machines 211 and 221. Execution monitoring involves monitoring the number of interactions between function executions and references to other code and data within the software program. In doing so, the execution monitors 212 and 222 collect information concerning the locality of execution and the references of each part of the execution.

Resource monitoring refers to the fact that resource monitors 213 and 223 measures the current and past usage of the system resources to determine the load the current constrained resources are under due to the execution of the software programs operating system and environment.

Load splitting refers to the fact that, using the above two types of information (provided by the execution monitoring and the resource monitoring), the load splitting engines 215 and 225 determine through a particular policy, whether one or a combination of two types of splitting are possible. A first type of splitting involves moving relatively independent or under-utilized storage resources off the device, over network link 230, from embedded device 210 to host device 220. A second type of splitting involves moving relatively independent code segments (for example components of the software program) off the embedded device 210, over the network 230, to the host device 220.

Lastly, the offloader 214 and 224 function by using the information provided by load splitters 215 and 225 and the resource monitors 213 and 223, and by determining when to considering changing the manner in which the software program is split and where it is best to offload the execution or resources, given the current resource consumption. User preferences can also be used in the load splitting determination, for example, through the use of preference dialog boxes presented to the user through a device GUI or program hints.

It should that the load sharing and load splitting can proceed in both directions. For example, once a load split is effected from the embedded device 210 to the host device 220, re-balancing can be implemented, wherein load is transferred back to the embedded device. Re-balancing can occur for a number of reasons, such as, for example, the execution load of the software program decreasing, the host device 220 being overloaded (e.g., with other processes), or the like.

Figure 3:
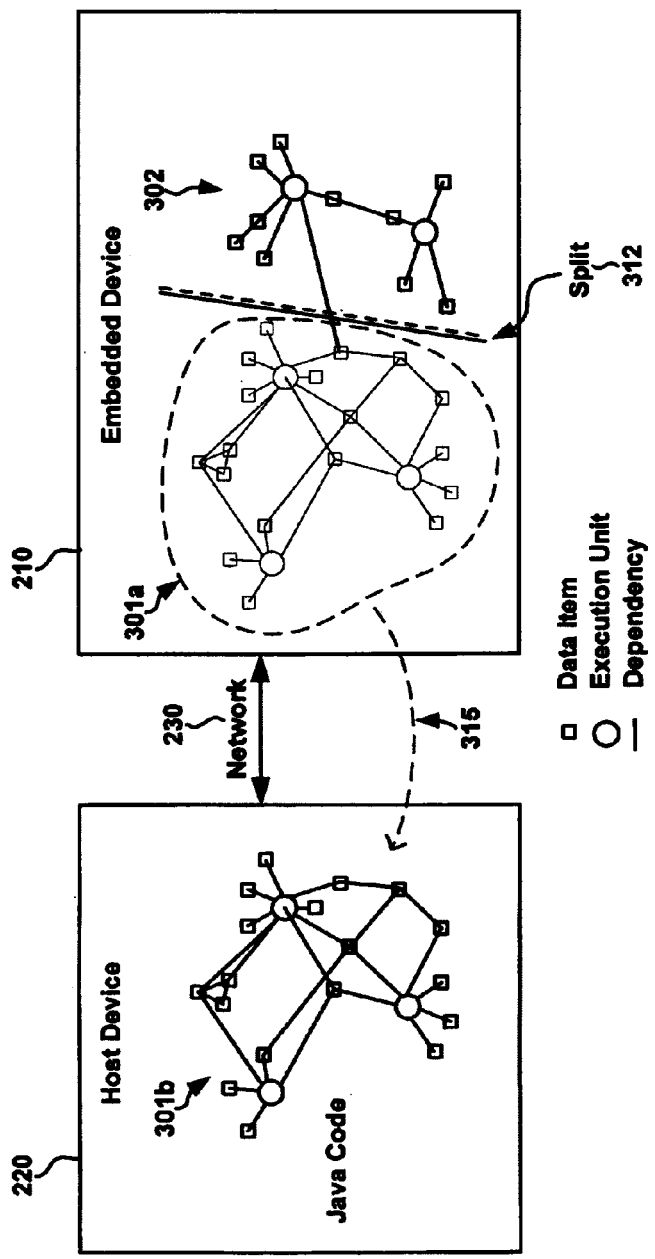
FIG. 3 shows a diagram depicting a load splitting and load sharing operation in accordance with one embodiment of the present invention.

FIG. 3 shows a diagram depicting a load splitting and load sharing operation in accordance with one embodiment of the present invention. As depicted in FIG. 3, the execution environment of the host device 220 is shown on the left side and the execution environment of the embedded device 210 is shown on the right side. On the far right side of FIG. 3, a descriptive legend showing the symbols used to represent data items, execution units, and dependencies are shown.

In the present embodiment, during operation, the code of a software program executes as it would do normally, until the resource monitor 213 of the embedded device 210 indicates that code execution is beginning to outstrip the resources available on the device 210. A program can outstrip the resources of device 210 for a number of reasons. This can occur, for example, due to program code size increases, program heap increases, the runtime execution queue length remaining high and requiring a high level of preemption, or other measures of processor load. A load split can also be implemented to control power consumption of the device 210. For example, where a software program would cause undue power consumption (e.g., computationally intensive, etc.), a load split can be initiated to move certain code segments from device 210 to host device 220. Thus generally the embodiments of the present invention perform the load splitting functions to beneficially offload code segments in accordance with various metrics (e.g., performance, power consumption, footprint, and the like).

The resource monitor 213 subsequently requests the load splitter 215 to consider a suitable split for the applications. Normally this will either be a resource-only offloading (e.g., "program data pushed to the host" type of offloading), an execution offloading (e.g., program code segments pushed to the host), or, most likely, a combination of the two, because moving either changes the cost of both execution and memory access. For example, line 315 shows one portion of a software program 301*a* being offloaded from embedded device 210 to host device 220 via network 230, where it executes as portion 301*b*.

In the present embodiment, as described above, the load splitter 215 of the embedded device 210 uses the information from the resource monitor 213 and execution monitor 212 to determine what type of split to use. Once the offloaded portion of the software program has been determined, the resource monitor 213 invokes the offloader 214 to cooperate with its host counterpart, offloader 224, to move the Java™ 211 knowledge of the program to the host Java VM™ 221 along with the data referenced. Execution of the remaining portion of the software program now references the offloaded portion of the software program (e.g., resources, execution, etc.) transparently over the network 230, relieving resource pressure from the embedded device 210.

It should be noted that, in accordance with other embodiments of the present invention, this offloading can occur recursively over a multi-tier environment. For example, in addition to a single-level offloading from an embedded device to a host device (e.g., in a two-tier fashion shown in FIGS. 2 and 3), multiple levels of offloading can be implemented, wherein, for example, offloading occurs from an embedded device to a first host, and then from the first host to a second, third, or other hosts. Multiple hosts can also be used simultaneously in a peer-type configuration in addition to, or instead of, a tiered configuration.

Additionally, it should be noted that each Java VM™ may also execute multiple software applications that share resources. Execution of multiple software applications in such a manner increases the load for the embedded device 210 and host 220, and increases the possible combinations of offloading. For example, one software application may be pushed mostly remotely if it is computationally intensive, while keeping an interactive application (e.g., requiring very responsive, low latency input and output from the user) mostly local.

Similarly, embodiments of the present invention can be configured to use a much more powerful host device computer system platform in order to improve the responsiveness and/or performance presented to a user. For example, in executing a demanding software program, the resource monitor 213 of the embedded device 210 can make a determination that the program will perform "better" if the computationally intensive portions of the program are offloaded to a much more powerful host device 220. Such an offloading can be implemented by the embedded device 210 even though the embedded device 210 may include sufficient computational resources to execute the software program locally itself.

Thus, embodiments of the present invention provide a number of advantages. For example, the load splitting functionality of the present invention allows both code, data, and execution to be offloaded from resource-constrained devices to improve the number of programs (and the look and feel of such programs) capable of being run by the devices. Embodiments of the present invention allow transparent offloading of services that exhibit good execution and memory locality clusters, such as, for example, when services contain a number of independent and internally tightly bound execution patterns. Embodiments of the present invention allow dynamic consideration of resource and execution placement to maintain performance. Additionally, the resource monitor and functionality of the present embodiments consider the cost of using remote resources (e.g., network bandwidth, footprint, etc.) rather than blindly doing so in accordance with some rigid, inflexible algorithm.

Figure 4:
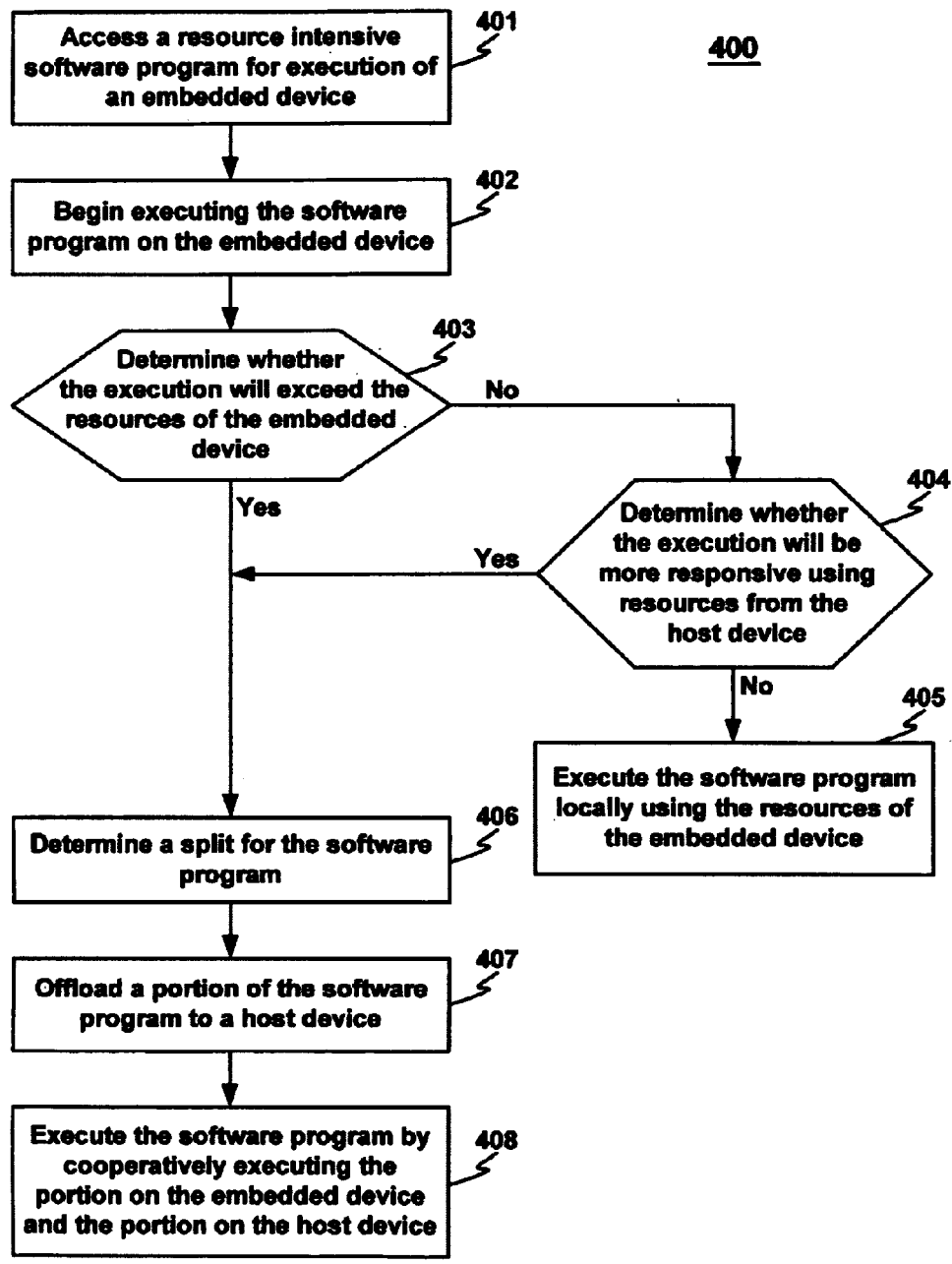
FIG. 4 shows a flowchart of the steps of a process in accordance with one embodiment of the present invention.

Referring to FIG. 4, a flowchart of the steps of a process 400 in accordance with one embodiment of the present invention is shown. As depicted FIG. 4, process 400 shows the steps involved in a resource monitoring and load splitting method in accordance with one embodiment of the present invention.

Process 400 begins in step 401, where a resource-intensive software program is accessed for execution by a resource-constrained device. As described above, typical resource-constrained devices in accordance with the present invention can include cell phones, PDAs, wristwatches, pagers, and the like. Typical resource-intensive software programs can include, for example, video applications, calendar and/or scheduling applications, and the like.

In step 402, execution of the software program is initiated on the embedded device. The software program can be, for example, accessed across a campus or company LAN. The embedded device would typically initiate execution of the software program locally. Alternatively, it should be noted that where the type of software application is known, process 400 can optionally jump directly to step 406 and determine a split for the software program, or optionally jump directly to step 407 and directly implement a split (where due to prior knowledge of the software program, the nature of the split is predetermined).

In step 403, once execution of the software program is begun, the embedded device determines whether the execution will exceed its local resources. As described above, the local resources of the embedded device are monitored. If the program appears as though it will not exceed the local resources, process 400 proceeds to step 404. If the program appears as though it will exceed the local resources, process 400 proceeds to step 406.

In step 404, even though execution of the software program may not exceed the resources of the embedded device, the embedded device determines whether the execution will be more responsive, or have increased performance with respect to some other metric, using the more capable host device. If so, process 400 proceeds to step 406. Otherwise, execution of the software program continues locally using the resources of the embedded device, as shown in step 405.

Referring still to FIG. 4, in step 406, where execution of the resource-intensive software program will exceed the resources of the embedded device, or where execution of the software program will be more responsive (or have increased performance with respect to some other metric) by invoking the host device, a load split for the software program is determined.

In step 407, a portion of the software program as determined by the load split is offloaded from the embedded device to a host device. As described above, the portion is transferred from the embedded device to the host device via a network communication link. Alternatively, as described above, portions of the software program can be transferred back from the host device to the embedded device (e.g., re-balancing), as the overall load dictates.

In step 408, the software program is executed cooperatively, one portion executing on the embedded device and another portion executing on the host device. The cooperative execution of both portions of the software program occurs transparently with respect to the user and the software program. As described above, however, the cooperative execution can alternatively be implemented in a non-transparent manner (e.g., confirmation boxes, etc.).

In this embodiment, the load splitting and cooperative execution of process 400 continues dynamically, wherein the cooperative execution and the respective resource utilization are tracked. This allows adjustments to be implemented as conditions require. This is indicated by process 400 proceeding back to step 403 after steps 405 and 408.

Thus, the present invention provides a method and system for offloading execution and resources for resource-constrained networked devices. The present invention provides a solution that compensates for the resource constraints of mobile embedded devices. The present invention provides a solution that compensates for the lack of any sizable local persistent storage in mobile embedded devices. The present invention enables a mobile embedded device to run a larger, more resource-intensive software applications despite the limited computer system resources of the device. Additionally, by using a virtual machine architecture, embodiments of the present invention provide a solution that supports the great diversity of different architectures of various different mobile embedded devices existing in the marketplace.

Computer System Environment

Figure 5:
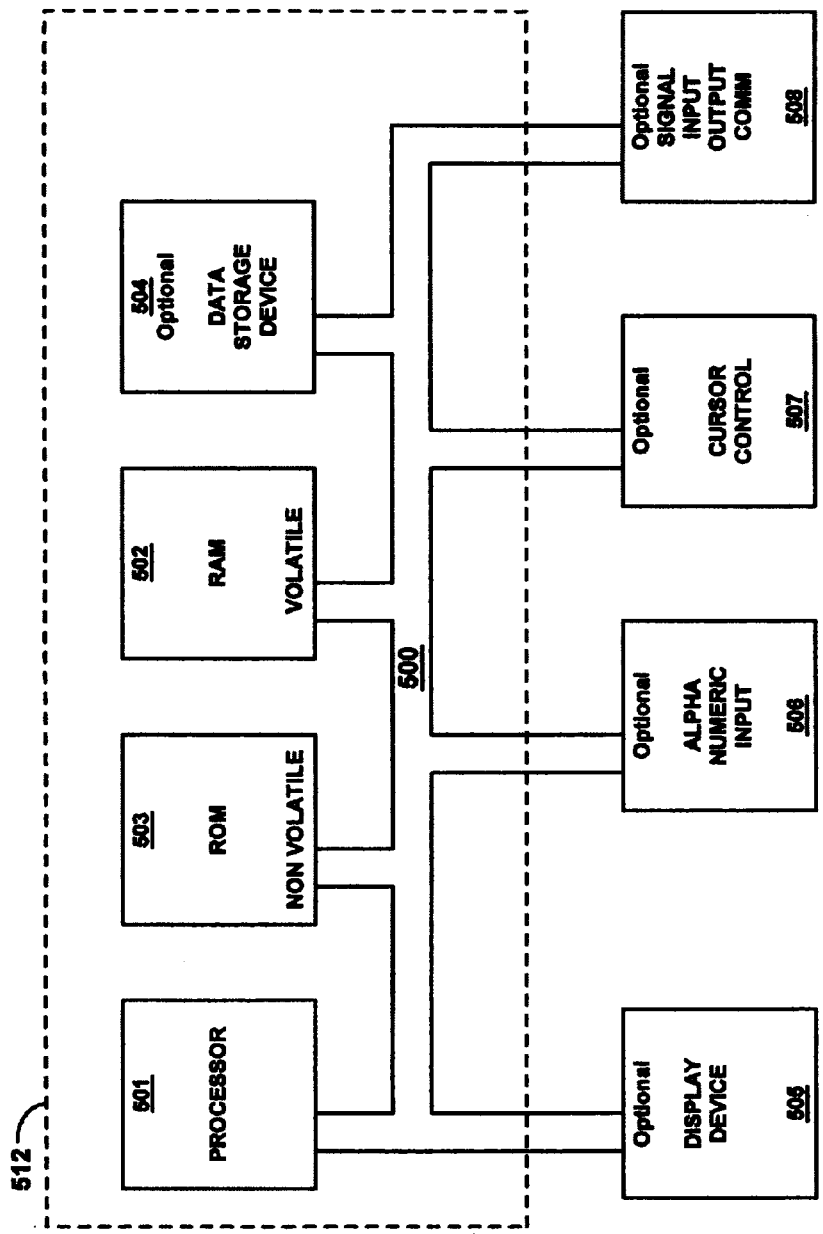
FIG. 5 shows a computer system platform in accordance with one embodiment of the present invention.

Referring to FIG. 5, a computer system 512 is illustrated. Within the discussions of the present invention, certain processes and steps are discussed that are realized, in one embodiment, as a series of instructions (e.g., software program) that reside within computer readable memory units of system 512 and executed by processors of system 512. When executed, the instructions cause computer system 512 to perform specific actions and exhibit specific behavior, which was described in detail above.

Specific aspects of the present invention are operable within a programmed computer system, which can function as an embedded device, a desktop device, a server device, or the like. A generalized example of such a computer system operable to implement the elements of the present invention is shown in FIG. 5. In general, the computer system of the present invention includes an address/data bus 500 for communicating information, one or more central processor(s) 501 coupled with bus 500 for processing information and instructions, a computer readable volatile memory unit 502 (e.g., random access memory, static RAM, dynamic RAM, etc.) coupled with bus 500 for storing information and instructions for the central processor(s) 501, a computer readable non-volatile memory unit 503 (e.g., read-only memory, programmable ROM, flash memory, EPROM, EEPROM, etc.) coupled with bus 500 for storing static information and instructions for processor(s) 501. System 512 can optionally include a mass storage computer-readable data storage device 504, such as a magnetic or optical disk and disk drive coupled with bus 500 for storing information and instructions. Optionally, system 512 can also include a display device 505 coupled to bus 500 for displaying information to the computer user, an alphanumeric input device 506 including alphanumeric and function keys coupled to bus 500 for communicating information and command selections to central processor(s) 501, a cursor control device 507 coupled to bus for communicating user input information and command selections to the central processor(s) 501, and a signal input/output device 508 coupled to the bus 500 for communicating messages, command selections, data, etc., to and from processor(s) 501.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to use the invention and various embodiments with various modifications as are suited to the particular use contemplated. It is intended that the scope of the invention be defined by the Claims appended hereto and their equivalents.

What is claimed is:

1. A computer implemented method for offloading execution load from a resource-constrained device to allow the device to run a resource-intensive software program, the method comprising:

accessing a program using a first resource-constrained computing device;

determining whether execution of the program will exceed resources of the first resource-constrained computing device;

determining a load split for the program to split the program into a first portion and a second portion;

offloading the second portion of the program to a second more capable computing device while retaining the first portion of the program on the first resource-constrained computing device, wherein the second more capable computing device is distinct from the first resource-constrained computing device; and providing a program functionality using the first resource-constrained computing device, wherein the functionality is provided by the first portion and the second portion executing cooperatively over a network connection between said first resource-constrained computing device and said second more capable computing device.

2. The method of claim 1 further comprising: executing the software program using the first resource-constrained computing device until the execution exceeds the resources of the first device.

3. The method of claim 1 further comprising:

using a resource monitor to determine whether execution of the program will exceed resources of the first resource-constrained computing device.

4. The method of claim 3, wherein the resource monitor is a software routine executing on the first resource-constrained computing device.

5. The method of claim 1 further comprising:

determining whether an execution queue length exceeds a predetermined length in order to determine whether execution of the program will exceed resources of the first resource-constrained computing device.

6. The method of claim 1 further comprising:

determining whether a program heap size exceeds a predetermined size in order to determine whether execution of the program will exceed resources of the first resource-constrained computing device.

7. The method of claim 1 further comprising:

determining whether an amount of memory consumed by the program exceeds a predetermined amount in order to determine whether execution of the program will exceed resources of the first resource-constrained computing device.

8. The method of claim 1 wherein the offloading of the second portion of the program comprises a memory resource offloading of the program to the second more capable computing device.

9. The method of claim 1 wherein the offloading of the second portion of the program comprises an execution offloading of the program to the second more capable computing device.

10. A computer readable media having thereon computer readable code which when executed by respective computer systems of a first device and a second device cause the devices to implement a method for offloading execution load from the first device to allow the first device to run a resource intensive software program, the method comprising:
accessing a program using a first resource-constrained computing device;
determining whether execution of the program will exceed resources of the first resource-constrained computing device;
determining a load split for the program to split the program into a first portion and a second portion;
offloading the second portion of the program to a second more capable computing device while retaining the first portion of the program on the first resource-constrained computing device, wherein the second more capable computing device is distinct from the first resource-constrained computing device; and
providing a program functionality using the first device, wherein the functionality is provided by the first portion and the second portion executing cooperatively over a network connection between said first resource-constrained computing device and said second more capable computing device.

11. The computer readable media of claim 10 further comprising:
executing the software program using the first device until the execution exceeds the resources of the first device.

12. The computer readable media of claim 10 further comprising:
using a resource monitor to determine whether execution of the program will exceed resources of the first device.

13. The computer readable media of claim 12, wherein the resource monitor is a software routine executing on the first device.

14. The computer readable media of claim 10 further comprising:
determining whether a run-time execution queue length exceeds a predetermined length in order to determine whether execution of the program will exceed resources of the first device.

15. The computer readable media of claim 10 further comprising:
determining whether a program heap size exceeds a predetermined size in order to determine whether execution of the program will exceed resources of the first device.

16. The computer readable media of claim 10 further comprising:
determining whether an amount of memory consumed by the program exceeds a predetermined amount in order to determine whether execution of the program will exceed resources of the first device.

17. The computer readable media of claim 10 wherein the offloading of the second portion of the program comprises a memory resource offloading of the program to the second device.

18. The computer readable media of claim 10 wherein the offloading of the second portion of the program comprises an execution offloading of the program to the second device.

19. A computer implemented system for offloading execution load from a resource-constrained device to a first computer system for a first device; a second computer system for a second device, the respective computer systems of the first device and the second device executing computer readable code that causes the devices to implement a method for offloading execution load from the first device to allow the first device to run a resource intensive software program, the method comprising:
accessing a program using a first resource-constrained computing device;
determining whether execution of the program will exceed resources of the first resource-constrained computing device;
determining a load split for the program to split the program into a first portion and a second portion;
offloading the second portion of the program to a second more capable computing device while retaining the first portion of the program on the first resource-constrained computing device, wherein the second more capable computing device is distinct from the first resource-constrained computing device; and
providing a program functionality using the first device, wherein the functionality is provided by the first portion and the second portion executing cooperatively over a network connection between said first resource-constrained computing device and said second more capable computing device.

20. The system of claim 19 further comprising:
determining whether a run-time execution queue length exceeds a predetermined length in order to determine whether execution of the program will exceed resources of the first device.

21. The system of claim 19 further comprising:
determining whether a program heap size exceeds a predetermined size in order to determine whether execution of the program will exceed resources of the first device.

22. The system of claim 19 further comprising:
determining whether an amount of memory consumed by the program exceeds a predetermined amount in order to determine whether execution of the program will exceed resources of the first device.

23. The system of claim 19 wherein the offloading of the second portion of the program comprises a memory resource offloading of the program to the second device.

24. The system of claim 19 wherein the offloading of the second portion of the program comprises an execution offloading of the program to the second device.

25. The system of claim 19 wherein a load splitter is used for determining the load split for the program, the load splitter configured to use resource utilization information and execution load information to determine the load split.

26. The system of claim 19 wherein an offloader is used for offloading the second portion of the program such that the first portion references the second portion during a cooperative execution.

27. The system of claim 19 wherein the offloading and the providing the program functionality occurs transparently with respect to a user of the first device.

28. The system of claim 19 wherein the offloading and the providing the program functionality occurs with an indication to a user of the first device.

29. The system of claim 19 wherein a code segment size of the program is used for determining whether execution of the program will exceed resources of the first device.

* * * * *